1## United States Patent
Mehra et al.

(10) Patent No.: US 12,309,134 B2
(45) Date of Patent: May 20, 2025

(54) METHODS AND SYSTEMS FOR PRE-SHARED KEY (PSK) BASED AUTHENTICATION IN COMMUNICATIONS

(71) Applicant: Nile Global, Inc., San Jose, CA (US)

(72) Inventors: Shiv Mehra, Saratoga, CA (US); Suresh Katukam, Milpitas, CA (US)

(73) Assignee: Nile Global, Inc., San Jose, CA (US)

( * ) Notice: Subject to any disclaimer, the term of this patent is extended or adjusted under 35 U.S.C. 154(b) by 332 days.

(21) Appl. No.: 17/824,721

(22) Filed: May 25, 2022

(65) Prior Publication Data

US 2023/0388285 A1 Nov. 30, 2023

(51) Int. Cl.
*H04W 12/069* (2021.01)
*H04L 9/40* (2022.01)
*H04W 4/24* (2018.01)

(52) U.S. Cl.
CPC .......... *H04L 63/0815* (2013.01); *H04L 63/10* (2013.01); *H04W 4/24* (2013.01); *H04W 12/069* (2021.01)

(58) Field of Classification Search
CPC . H04L 63/0815; H04L 63/10; H04L 63/0892; H04W 4/24; H04W 12/069; H04W 12/06
See application file for complete search history.

(56) References Cited

U.S. PATENT DOCUMENTS

| | | | |
|---|---|---|---|
| 9,674,892 B1 * | 6/2017 | Li | H04L 63/123 |
| 10,680,806 B1 * | 6/2020 | Kaliski, Jr. | H04L 9/3226 |
| 10,735,397 B2 | 8/2020 | Ronda et al. | |
| 2013/0176897 A1 * | 7/2013 | Wang | H04W 88/08 370/254 |
| 2013/0298209 A1 * | 11/2013 | Targali | H04W 12/06 726/6 |
| 2014/0165162 A1 * | 6/2014 | Black | H04L 63/08 726/4 |
| 2014/0365777 A1 * | 12/2014 | Cha | G06F 21/53 713/171 |
| 2016/0044124 A1 * | 2/2016 | Sarukkai | H04L 43/0876 709/224 |
| 2016/0149898 A1 * | 5/2016 | Parla | H04L 63/04 726/6 |
| 2019/0028892 A1 * | 1/2019 | Henry | H04W 12/069 |
| 2019/0253407 A1 * | 8/2019 | Livanos | H04W 12/04 |
| 2019/0319962 A1 * | 10/2019 | Karunakaran | H04W 12/06 |
| 2020/0092254 A1 * | 3/2020 | Goeringer | H04L 45/46 |
| 2020/0099675 A1 * | 3/2020 | Mardiks Rappaport | H04L 63/1466 |
| 2020/0137054 A1 * | 4/2020 | Isola | H04L 63/1441 |

OTHER PUBLICATIONS

Aerohive Networks, "Aerohive PPSK Guide", 2017, 29 pgs.

* cited by examiner

*Primary Examiner* — Aftab N. Khan

(74) *Attorney, Agent, or Firm* — LOZA & LOZA, LLP

(57) ABSTRACT

Embodiments of a device and method are disclosed. In an embodiment, a method for communications involves at a cloud server, restricting network access of a user after a Pre-Shared Key (PSK) of the user is transmitted, and at the cloud server, redirecting the user to an identity provider for authentication after restricting network access of the user.

17 Claims, 11 Drawing Sheets

METHODS AND SYSTEMS FOR PRE-SHARED KEY (PSK) BASED AUTHENTICATION IN COMMUNICATIONS

BACKGROUND

Growing adoption of networks, such as, enterprise campus networks allows enterprises to increase network coverage and functionality. Network operations, such as authentication, authorization, and accounting (AAA) operations, play an important role in safeguarding and managing a network, such as, an enterprise campus network. For example, a centralized Remote Authentication Dial-In User Service (RADIUS) server can be used to authenticate users and authorize their access to requested systems or services. However, in some scenarios, a RADIUS server or service may be impracticable or overly costly to implement. Therefore, there is a need for network technology that can provide reliable and efficient communications for users in a network without a dedicated RADIUS server.

SUMMARY

Embodiments of a device and method are disclosed. In an embodiment, a method for communications involves at a cloud server, restricting network access of a user after a Pre-Shared Key (PSK) of the user is transmitted, and at the cloud server, redirecting the user to an identity provider for authentication after restricting network access of the user. Other embodiments are also described.

In an embodiment, at the cloud server, redirecting the user to the identity provider for authentication after restricting network access of the user includes at the cloud server, redirecting the user to the identity provider for single sign-on (SSO) authentication after restricting network access of the user.

In an embodiment, at the cloud server, redirecting the user to the identity provider for authentication after restricting network access of the user includes at the cloud server, redirecting the user to the identity provider for Security Assertion Markup Language (SAML) based authentication after restricting network access of the user.

In an embodiment, the user operates a network device that is connected to the cloud server through a wireless link.

In an embodiment, the network device is wirelessly connected to a wireless access point (AP) that has access to the cloud server.

In an embodiment, the method further includes at the cloud server, allowing network access of a second user after a second PSK of the second user is transmitted when a Media Access Control (MAC) address of a network device at which the second user operates matches an entry in a predetermined list of allowed MAC addresses.

In an embodiment, at the cloud server, restricting network access of the user after the Pre-Shared Key (PSK) of the user is transmitted includes determining that a MAC address of a network device at which the user operates does not match an entry in a predetermined list of allowed MAC addresses.

In an embodiment, the method further incudes at the cloud server, receiving attributes of the user from the identity provider after the user is successfully authenticated.

In an embodiment, the method further includes at the cloud server, allowing network access of the user after the attributes of the user are received from the identity provider.

In an embodiment, the method further includes at the cloud server, performing an accounting operation of the user based on the attributes of the user are received from the identity provider.

In an embodiment, at the cloud server, performing the accounting operation of the user includes at the cloud server, performing the accounting operation of the user to generate billing information for the user based on the attributes of the user are received from the identity provider.

In an embodiment, the method further includes at the cloud server, allowing network access of the user after the Pre-Shared Key (PSK) of the user is retransmitted in a subsequent sign-on session.

In an embodiment, the method further includes at the cloud server, exchanging MAC Authentication Bypass (MAB) request and response messages in the subsequent sign-on session.

In an embodiment, the method further includes exchanging Dynamic Host Configuration Protocol (DHCP) information between a network device at which the user operates and a network element that has access to the cloud server.

In an embodiment, the identity provider is not a Remote Authentication Dial-In User Service (RADIUS) server.

In an embodiment, a method for communications involves at a cloud server, restricting network access of a user after a PSK of the user is transmitted, wherein the user operates a network device that is connected to the cloud server through a wireless link, and at the cloud server, redirecting the user to an identity provider for SSO authentication after restricting network access of the user.

In an embodiment, at the cloud server, restricting network access of the user after the PSK of the user is transmitted includes determining that a Media Access Control (MAC) address of a network device at which the user operates does not match an entry in a predetermined list of allowed MAC addresses.

In an embodiment, the method further includes at the cloud server, allowing network access of a second user after a second PSK of the second user is transmitted when a MAC address of a network device at which the second user operates matches an entry in a predetermined list of allowed MAC addresses.

In an embodiment, the method further includes at the cloud server, receiving attributes of the user from the identity provider after the user is successfully authenticated, and at the cloud server, allowing network access of the user after the attributes of the user are received from the identity provider.

In an embodiment, a method for communications involves at a cloud server, restricting network access of a user after a Pre-Shared Key (PSK) of the user is transmitted, at the cloud server, redirecting the user to an identity provider for Security Assertion Markup Language (SAML) based authentication after restricting network access of the user, at the cloud server, receiving attributes of the user from the identity provider after the user is successfully authenticated, and at the cloud server, allowing network access of the user after the attributes of the user are received from the identity provider.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
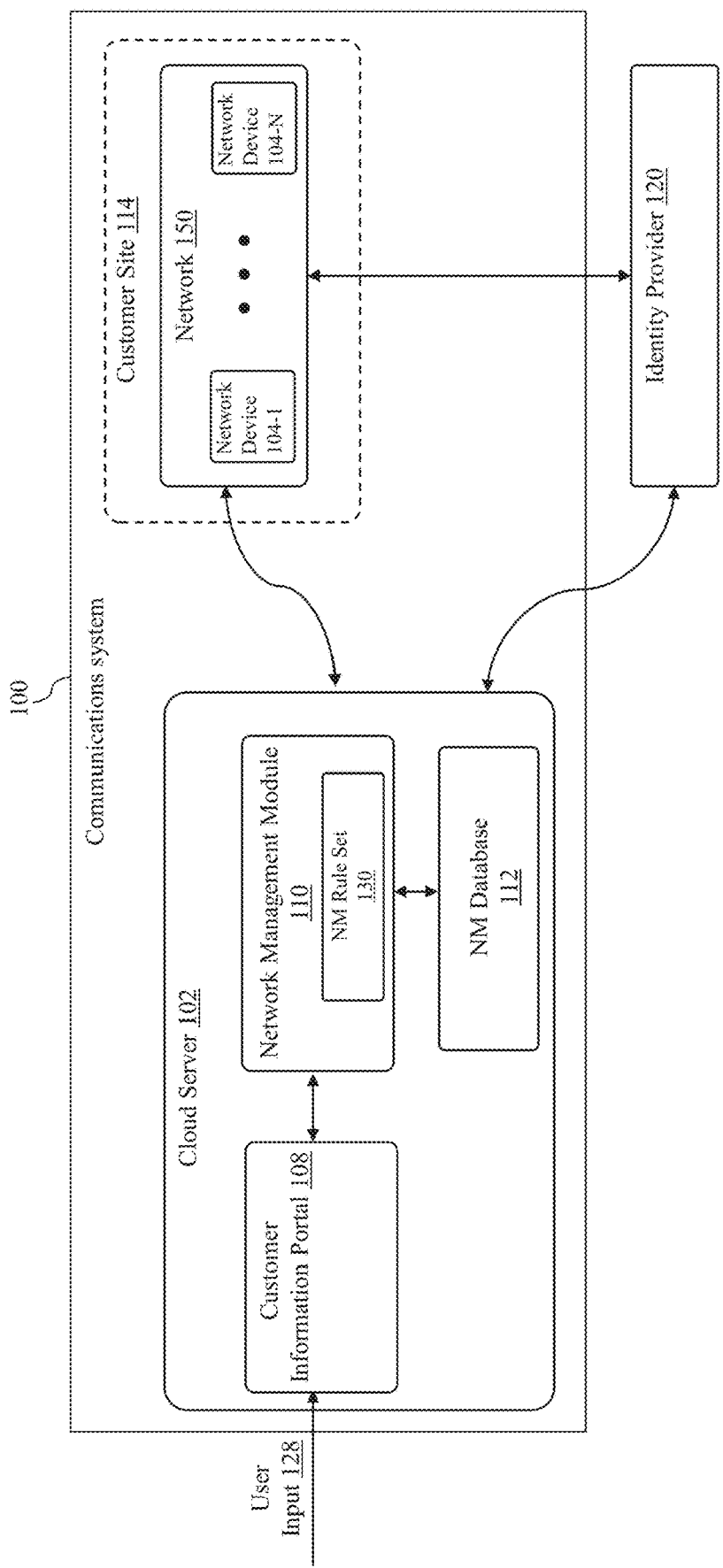
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114 and interacts with an identity provider (IdP) 120. The cloud server, the deployed network, and/or the identity provider 120 may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1. In another example, although the identity provider 120 is shown in FIG. 1 as being separate from the communications system 100, in some embodiments, the identity provider 120 is included in the communications system 100.

The cloud server 102 can be used to provide at least one service to a customer site (e.g., to the deployed network 150 located at the customer site 114). The cloud server may be configured to facilitate or perform a network management service (e.g., at least one of authentication, authorization, and accounting (AAA) services) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM 110, and a network management (NM) database 112 configured to store NM data. The NMM, the customer information portal, and/or the NM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM, more than one customer information portal, and/or more than one NM database. In another example, although the NMM, the customer information portal, and the NM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM 110 is configured to facilitate or perform a network management (NM) service (e.g., at least one of authentication, authorization, and accounting (AAA) services) to network devices (e.g., the deployed network 150) at the customer site 114, for example, using an NM rule set 130. The NM rule set 130 may include one or more NM rules (e.g., at least one of authentication, authorization, and accounting (AAA) rules) for network devices at the customer site 114, for example, for performing an NM service (e.g., at least one of authentication, authorization, and accounting (AAA) services) to network devices at the customer site 114. In some embodiments, the NMM 110 is configured to generate and/or transmit at least one alert (e.g., a device outage alert, a network throughput alert, and/or a network security alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NM database 112 is configured to store NM data (e.g., security data) for a network deployed and/or to be deployed at the customer site (e.g., a list of network devices deployed or to be deployed at the customer site). In some embodiments, the NM database 112 is configured to store the at least one NM alert. Because the NMM can facilitate or perform an NM service (e.g., at least one of authentication, authorization, and accounting (AAA) services) for network devices at the customer site, network operation efficiency can be improved. In addition, because the NMM can facilitate or perform a network service or operation for network devices at the customer site, an administrator or a customer can be notified of device and/or network conditions or outages. Consequently, device and/or network outage, low performance time, or a security breach period can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NM service for the customer site 114, such as one or more specific requirements or restrictions.

In the embodiment depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, ..., 104-N, where N is a positive integer. In some embodiments, at least one of the one or more network devices 104-1, ..., 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, ..., 104-N is compatible with an Institute of Electrical and Electronics Engineers (IEEE) 802.3 protocol, one or more wireless local area network (WLAN) communications protocols, such as an IEEE 802.11 protocol, and/or a short-range communications protocol, such as Bluetooth. In some embodiments, at least one of the network devices 104-1, ..., 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, ..., 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol).

In the embodiment depicted in FIG. 1, the identity provider 120 is configured to provide an identification service to the communications system 100. For example, the identity provider 120 provides an authentication service to the network devices 104-1, . . . , 104-N of the network 150. In some embodiments, the identity provider 120 is configured to create, store, maintain, manage, and/or verify identity information for users, for example, users that have access to or use the network devices 104-1, . . . , 104-N of the network 150. The identity provider 120 may authenticate users for single sign-on (SSO). For example, the identity provider 120 may be a trusted provider that enables a customer to use SSO to access other network resources and/or websites. The identity provider 120 can offer user authentication as a service, for example, as a cloud-hosted service. The identity provider 120 and the communications system 100 may be operated by different entities. In some embodiments, the identity provider 120 is a network based or a cloud base system. For example, the identity provider 120 is coupled to the cloud server 102 and the network 150 through one or more networks, such as, the Internet. Although the identity provider 120 is shown in FIG. 1 as being separate from the communications system 100, in some embodiments, the identity provider 120 is included in the communications system 100. The identity provider 120 may be implemented in hardware (e.g., circuits), software, firmware, or a combination thereof. In some embodiments, the identity provider 120 is hosted or executed in a public cloud computing environment such as Amazon Web Services (AWS), and/or a private cloud computing environment such as an enterprise cloud server. In some embodiments, the identity provider 120 is implemented on a server grade hardware platform, such as an x86 architecture platform. For example, the hardware platform may include conventional components of a computing device, such as one or more processors (e.g., CPUs), system memory, a network interface, storage system, and other I/O devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more RAM modules. In some embodiments, the network interface is configured to enable the hardware platform to communicate with another device via a communication medium. The network interface may be one or more network adapters, also referred to as an NIC. In some embodiments, the hardware platform includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

Figure 2:
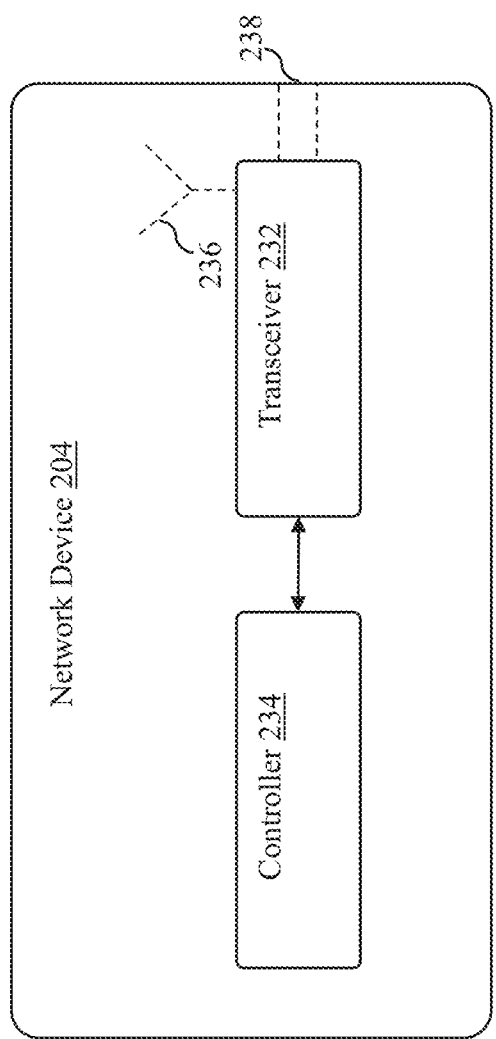
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch (DS), a gateway or headend (HE), an access switch (AS), a wireless access point (AP), a sensor, a laptop, a desktop personal computer (PC), or a mobile phone. In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

Figure 3:
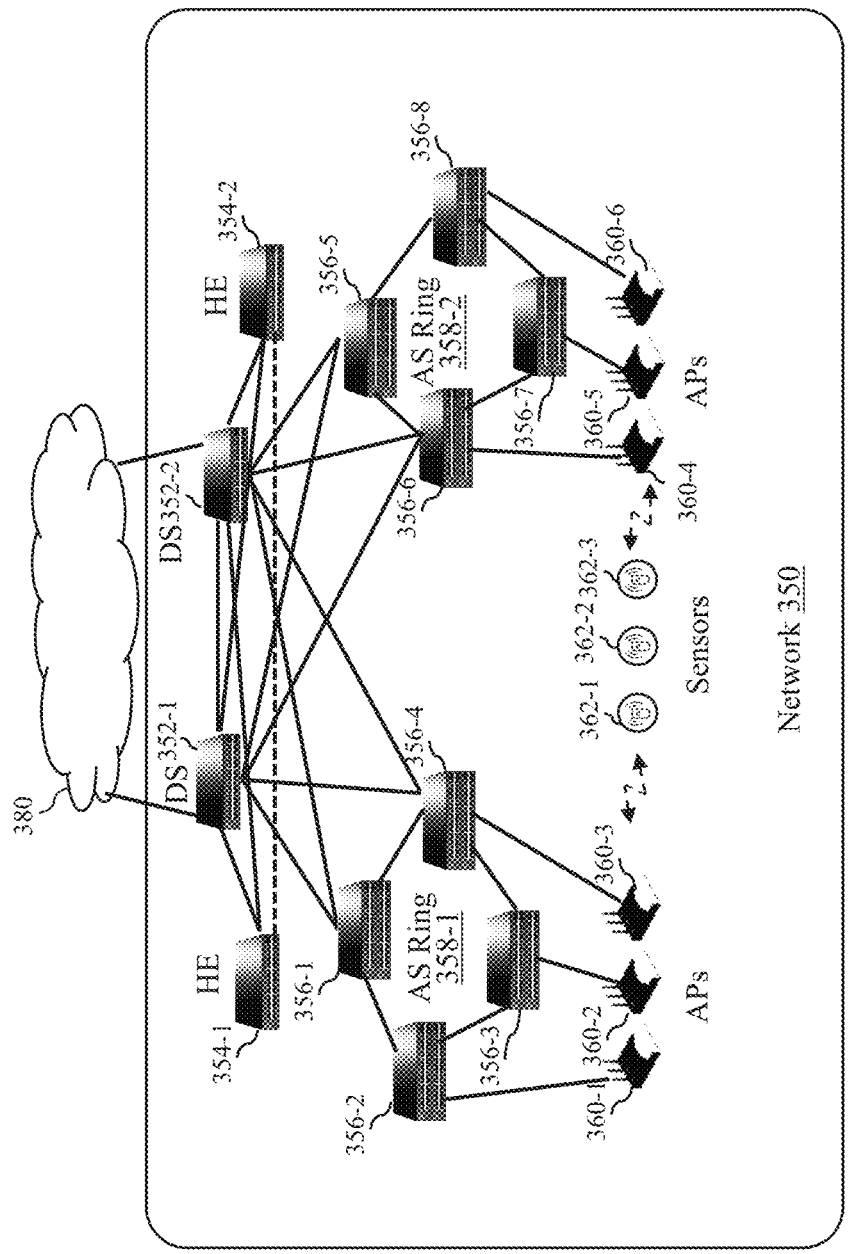
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), optional wireless APs 360-1, 360-2, 360-3, 360-4, 360-5, 360-6 connected to the ASs, and optional wireless sensors 362-1, 362-2, 362-3 that wirelessly connect to the wireless AP. In some embodiments, the network 350 includes one or more communications devices (e.g., laptops, desktop PCs, or other devices) that are connected to one or more ASs through cables or wires, for example, Ethernet cables. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 may be an embodiment of the network device 204 depicted in FIG. 2. In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the network management module (NMM) 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, and/or less than three wireless sensors, more than three wireless sensors. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

Figure 4:
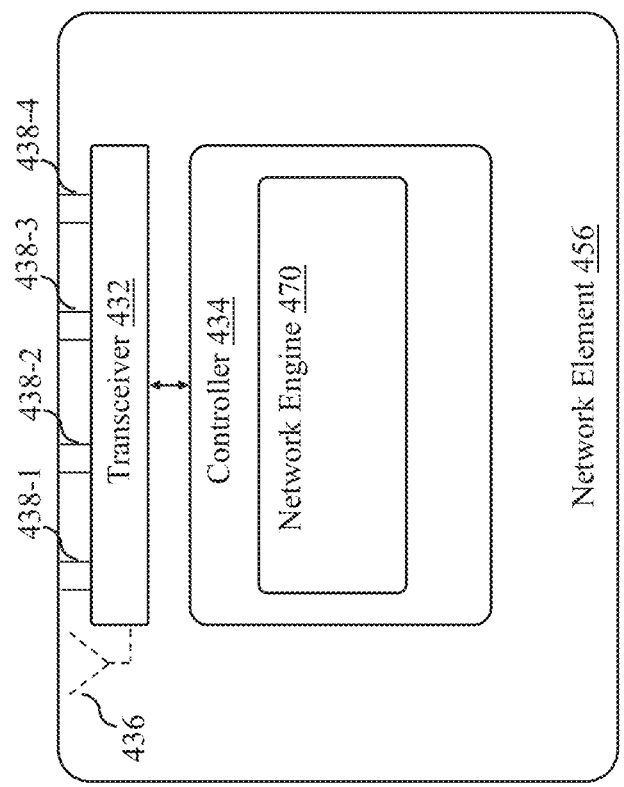
FIG. 4 depicts an embodiment of a network element that can be included in the network depicted in FIG. 3.

FIG. 4 depicts an embodiment of a network element 456 that can be included in the network 350 depicted in FIG. 3. The network element 456 may be an embodiment of the DSs 352-1, 352-2, the HEs 354-1, 354-2, the ASs 356-1, 356-2, 356-3, 356-4, 356-5, 356-6, 356-7, 356-8, and/or the wireless APs 360-1, 360-2, 360-3, 360-4, 360-5, 360-6 of the network 350 depicted in FIG. 3. However, the DSs 352-1, 352-2, the HEs 354-1, 354-2, the ASs 356-1, 356-2, 356-3, 356-4, 356-5, 356-6, 356-7, 356-8, and/or the wireless APs 360-1, 360-2, 360-3, 360-4, 360-5, 360-6 of the network 350 depicted in FIG. 3 are not limited to the embodiment depicted in FIG. 4. In the embodiment depicted in FIG. 4, the network element 456 includes at least one wireless and/or wired transceiver 432, four network ports 438-1, 438-2, 438-3, 438-4 operably connected to the transceiver 432, an optional antenna 436, and a controller 434 operably connected to the transceiver 432. In some embodiments, the transceiver 432 includes a physical layer (PHY) device. The transceiver 432 may be any suitable type of transceiver. For example, the transceiver 432 may be a LAN (e.g., Ethernet) transceiver. In some embodiments, the network element 456 includes multiple transceivers. The network ports 438-1, 438-2, 438-3, 438-4 may be any suitable type of ports. For example, the network ports 438-1, 438-2, 438-3, 438-4 may be LAN network ports such as Ethernet ports. However, the network ports 438-1, 438-2, 438-3, 438-4 are not limited to LAN network ports. Although the network element 456 is shown in FIG. 4 as including four network ports, in other embodiments, the network element 456 may include more than four network ports or less than four network ports. The network ports 438-1, 438-2, 438-3, 438-4 can be used to connect the network element to corresponding network ports of wired communications devices. For example, the network ports 438-1, 438-2 are connected to network ports of ASs or DSs, while the network ports 438-3, 438-4 are connected to a wireless AP and a wired communications device (e.g., a laptop computer or a desktop computer), two wireless APs, or two wired communications devices. In some embodiments, the network element 456 includes different number of network ports. In some embodiments, the network element works in Layer 3 or L3 (i.e., the network layer, which is the third level (Layer 3) of the OSI Model) environment and is connected to other wired devices under L3 mode. In some embodiments, the network element 456 includes more than antennas. In some embodiments, the controller 434 is configured to control the transceiver 432 to process packets received through the network ports 438-1, 438-2, 438-3, 438-4 and/or the antenna 436 and/or to generate outgoing packets to be transmitted through the network ports 438-1, 438-2, 438-3, 438-4. In some embodiments, the controller 434 is configured to obtain and/or store communications and/or security information relevant to the network element 456. In some embodiments, the controller 434 executes one or more Layer 3 (L3) protocols, for example, an Internal Gateway Protocol (IGP) (e.g., an OSPF)\ protocol), a Border Gateway Protocol (BGP), or an Intermediate System to Intermediate System (IS-IS) protocol. The controller 434 may include a processor (e.g., a microcontroller, a DSP, and/or a CPU) configured to execute one or more Layer 3 (L3) protocols, and memory that may store information (e.g., an OS) for the processor.

In the embodiment depicted in FIG. 4, the network element 456 includes a network engine 470 configured to execute one or more network protocols. For example, the network engine 470 is configured to execute one or more Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the network engine 470 includes or is implemented using a processor (e.g., a microcontroller, a DSP, and/or a CPU) configured to execute one or more protocols, and memory that may store information (e.g., an OS) for the processor. For example, the controller 434 is implemented using a processor and memory, and the network engine 470 is a software module that executes in the processor. In some embodiments, the controller 434 (e.g., the network engine 470) includes a storage device (e.g., one or more hard disks, flash memory modules, solid state disks, and/or optical disks) that contains or stores predefined information (e.g., a predefined security certificate), which may be placed or embedded into the network element 456 during a manufacturing process.

Figure 5:
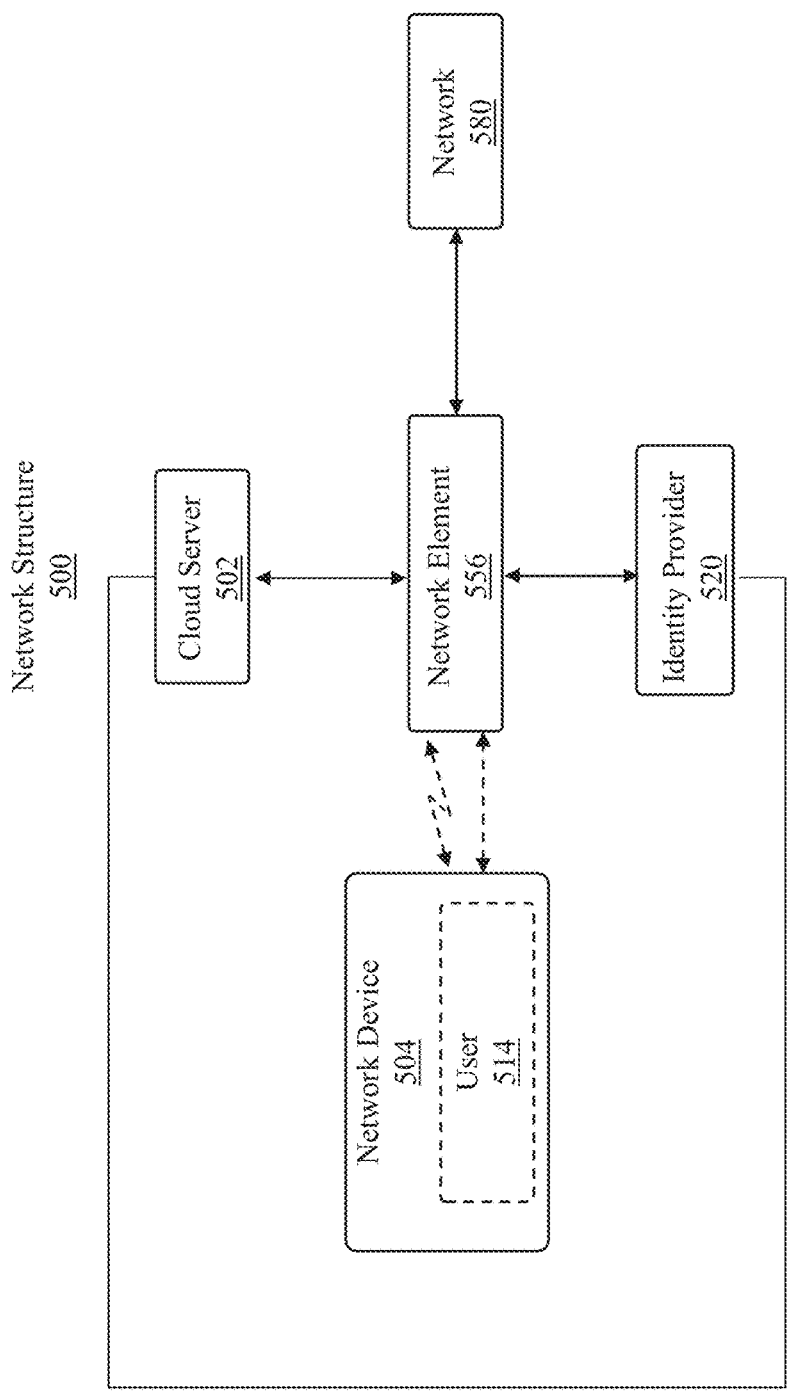
FIG. 5 shows a network structure that includes a network device having a user, a network element, a cloud server, an identity provider, and a network.

FIG. 5 shows a network structure 500 that includes a network device 504 having a user 514, a network element 556, a cloud server 502, an identity provider 520, and a network 580. The network device 504 is an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 5. The user 514 may be an end-user of the network device 504 or an application executing on the network devices 504. For example, the user 514 may be an end-user (e.g., an employee or a customer) that operates at or uses the network device 504. The network element 556 depicted in FIG. 5 is an embodiment of the network element 456 depicted in FIG. 4. However, the network element 456 depicted in FIG. 4 is not limited to the embodiment depicted in FIG. 5. The network element 556 may be a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3). The network device 504 may be connected to the network element 556 through a network cable and/or wirelessly connected to the network element 556. For example, the network device 504 may be wirelessly connected to the network element 556, which may be a wireless AP. In another example, the network device 504 may be connected to the network element 556 through a network cable. The cloud server 502 depicted in FIG. 5 and the identity provider 520 depicted in FIG. 5 are embodiments of the cloud server 102 and the identity provider 120 depicted in FIG. 1, respectively. However, the cloud server 102 and the identity provider 120 depicted in FIG. 1 are not limited to the embodiments depicted in FIG. 5. The network 580 depicted in FIG. 5, which may be the Internet, is an embodiment of the network 380 depicted in FIG. 3. However, the network 380 depicted in FIG. 3 is not limited to the embodiment depicted in FIG. 5. In the embodiment depicted in FIG. 5, for the user 514 of the network device 504 to access network resources at and/or through the network 580, a sign-on procedure takes place between the user 514/the network device 504, the network element 556, the cloud server 502, and the identity provider 520. Specifically, the identity provider 520, for example, as a cloud-hosted service, authenticates the user 514 to verify the identity of the user and the cloud server 502 authorizes the access of the user 514 to requested systems or services. In some embodiments, the identity provider is not a Remote Authentication Dial-In User Service (RADIUS) server, which may be impracticable or excessively expensive to implement. By using the identity provider 520 to authenticate the user 514, the need for a centralized RADIUS server is reduced or eliminated. Consequently, the network structure 500 can be used in scenarios in which a RADIUS server or service is impracticable or excessively expensive to implement to provide reliable and efficient communications in a network without a dedicated RADIUS server.

In some embodiments, the network structure 500 implements a Pre-Shared Key (PSK) based Single Sign-On (SSO). The cloud server 502 may integrate with the identity provider 520 to identify Pre-Shared Key (PSK) users. A network administrator may configure SSO information in the cloud server 502. A PSK based wireless service that is provided by the network element 556 and/or the cloud server 502 may force a new user 514 to authenticate against the identity provider 520. In some embodiments, once authenticated, the cloud server 502 maps the network device 504 to the user 514 and keeps track of all devices used by the user 514 and thus provides user-based accounting (e.g., billing). By using the identity provider 520 to authenticate the user 514, the need for a centralized RADIUS server is reduced or eliminated. Consequently, the network structure 500 can be used in scenarios in which a RADIUS server or service is impracticable or excessively expensive to implement to provide reliable and efficient communications and user-based accounting (e.g., billing) in a network without a dedicated RADIUS server.

In some embodiments, the network structure 500 implements Media Access Control (MAC) based authentication for wireless service and/or wired service. For example, the cloud server 502 may decide whether to allow or restrict/block access of the user 514/the network device 504 to the network 580 (e.g., the Internet). The user 514/the network device 504 may be granted access to the network 580 (e.g., the Internet) if the user 514/the network device 504 is in a predetermined list of allowed users or devices. In some embodiments, the cloud server 502 grants or allows the user 514/the network device 504 to access the network 580 (e.g., the Internet) if identification information of the user 514/the network device 504 (e.g., the Media Access Control (MAC) address of the network device 504) matches an entry in a predetermined list of identifications (e.g., MAC addresses) of allowed users or devices.

In some embodiments, the cloud server 502 integrates with the identity provider 520 and is notified when the user 514 (e.g., an employee of a company) leaves an entity (e.g., the company for which an employee works). The cloud server 502 can delete the user 514 from its database (e.g., the database 112 depicted in FIG. 1), which forces the user 514 to re-authenticate via SSO, and consequently, prevents unauthorized access to company assets. In some embodiments, a network administrator manually deletes the user 514 through an interface (e.g., the customer information portal 108 depicted in FIG. 1) provided by the cloud server 502, which causes the user 514 to be restricted access to the network 580 indefinitely.

In some embodiments, the cloud server 502 is configured to restrict network access of the user 514 after a Pre-Shared Key (PSK) of the user is transmitted, and redirect the user to the identity provider 520 for authentication after restricting network access of the user. The user may be restricted to access the identity provider 520 only, if authentication is successful, the user will have full access, otherwise the user is blocked. For example, the cloud server may redirect the user to the identity provider for single sign-on (SSO) authentication after restricting network access of the user. In another example, the cloud server may redirect the user to the identity provider for Security Assertion Markup Language (SAML) based authentication after restricting network access of the user. In some embodiments, the user 514 operates the network device 504 that is connected to the cloud server 502 through a wireless link. For example, the network device 504 is wirelessly connected to a wireless access point (AP) that has access to the cloud server. In some embodiments, the cloud server is configured to allow network access of a second user after a second Pre-Shared Key (PSK) of the second user is transmitted when a Media Access Control (MAC) address of a network device at which the second user operates matches an entry in a predetermined list of allowed MAC addresses. In some embodiments, the cloud server is configured to determine that a Media Access Control (MAC) address of a network device at which the user operates does not match an entry in a predetermined list of allowed MAC addresses. In some embodiments, the cloud server is configured to receive attributes of the user from the identity provider after the user is successfully authenticated. The cloud server may allow network access of the user after the attributes of the user are received from the identity provider. In some embodiments, the cloud server is configured to perform an accounting operation of the user based on the attributes of the user are received from the identity provider. The cloud server may perform the accounting operation of the user to generate billing information for the user based on the attributes of the user are received from the identity provider. In some embodiments, the cloud server is configured to allow network access of the user after the Pre-Shared Key (PSK) of the user is retransmitted in a subsequent sign-on session. The cloud server may exchange authentication (auth) request and response messages, for example, MAC Authentication Bypass (MAB) request and response messages, in the subsequent sign-on session.

Figure 6:
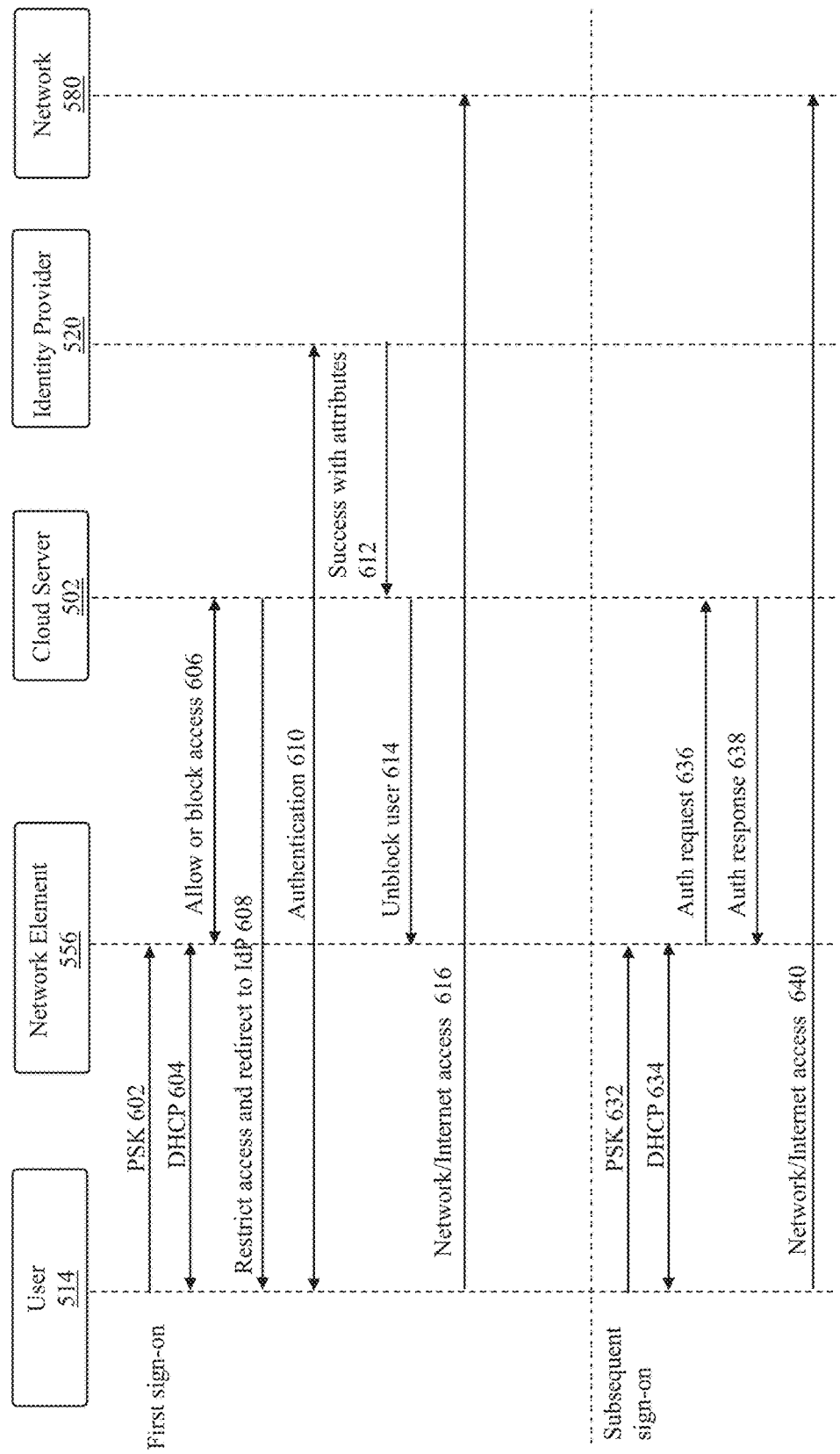
FIG. 6 shows a swim-lane diagram illustrating an example sign-on procedure between the user, the network element, the cloud server, the identity provider, and the network of the network structure depicted in FIG. 5.

FIG. 6 shows a swim-lane diagram illustrating an example sign-on procedure between the user 514, the network element 556, the cloud server 502, the identity provider 520, and the network 580 of the network structure 500 depicted in FIG. 5. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations.

A first sign-on session for the user 514, which may be a Single Sign-On (SSO) session in which the user 514 logs in multiple independent systems (e.g., multiple applications and/or websites) using a single set of credentials (e.g., a single ID), takes place from operation 602 to operation 616. At operation 602, a Pre-Shared Key (PSK) is transmitted from the user 514/the network device 504 to the network element 556, which may be, for example, a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3). The PSK may be processed by the network element 556, which can verify the PSK against pre-stored keys in a database and restrict network access of the user 514 if the PSK is incorrect or does not match any pre-stored key. At operation 604, DHCP communications (e.g., DHCP discovery, DHCP offer, DHCP request, and DHCP acknowledgement) between the user 514/the network device 504 and the network element 556 are conducted. At operation 606, the cloud server 502 interacts with the network element 556 and decides whether to allow or restrict/block access of the user 514/the network device 504 to the network 580 (e.g., the Internet). For example, the user 514/the network device 504 may be granted access to the network 580 (e.g., the Internet) if the user 514/the network device 504 is in a predetermined list of allowed users or devices. In some embodiments, the cloud server 502 grants or allows the user 514/the network device 504 to access the network 580 (e.g., the Internet) if identification information of the user 514/the network device 504 (e.g., the Media Access Control (MAC) address of the network device 504) matches an entry in a predetermined list of identifications (e.g., MAC addresses) of allowed users or devices. At operation 608, the cloud server 502 blocks or restricts the access of the user 514/the network device 504 to the network 580 (e.g., the Internet) and redirects the sign-on session (e.g., an SSO session) to the identity provider 520. In some embodiments, operation 606 is optional and the cloud server 502 blocks or restricts the access of the user 514/the network device 504 to the network 580 (e.g., the Internet) and redirects the sign-on session (e.g., an SSO session) to the identity provider (IdP) 520 after the DHCP operation 604. At operation 610, the identity provider 520 authenticates the user 514/the network device 504, for example, for Single Sign-On (SSO) to log in multiple independent systems (e.g., multiple applications and/or websites) using a single set of credentials (e.g., a single ID). The operation 610 may involve the network element 556, which can serve as a proxy to forward messages between the user 514/the network device 504 and the identity provider 520. The identity provider 520 may use one or more authentication techniques to authenticate the user 514/the network device 504. In some embodiments, the identity provider 520 performs single-factor/primary authentication, two-factor authentication (2FA), or multi-factor authentication (MFA). The identity provider 520 may perform Security Assertion Markup Language (SAML) based authentication. In some embodiments, the identity provider 520 performs a Security Assertion Markup Language (SAML) based authentication, which allows the identity provider 520 to authenticate a user and then pass an authentication token to the cloud server 502, which is also known as a service provider (SP). At operation 612, the identity provider 520 successfully authenticates the user 514/the network device 504 (e.g., the credentials (e.g., the ID) provided by or received from the user 514 matches credentials or ID of the user 514 stored in the identity provider 520) and sends network attributes associated with the user 514 to the cloud server 502. Examples of network attributes associated with the user 514 may include, without being limited to, first name and last name of the user, email ID of the user, employee ID of the user, employee location of the user, an address of the user, and an organization to which the user belong. Once authenticated, the cloud server 502 may map the network device 504 to the user 514 and keep track of all devices used by the user 514 and thus provide user-based accounting (e.g., billing). By using the identity provider 520 to authenticate the user 514, the need for a centralized Remote Authentication Dial-In User Service (RADIUS) server is reduced or eliminated. Consequently, the network structure 500 can be used in scenarios in which a RADIUS server or service is impracticable or excessively expensive to implement to provide reliable and efficient communications and user-based accounting (e.g., billing) in a network without a dedicated RADIUS server. At operation 614, the cloud server 502 un-restricts or allows the access of the user 514/the network device 504 to the network 580 (e.g., the Internet), for example, to access multiple independent systems (e.g., multiple applications and/or websites). At operation 616, the user 514/the network device 504 successfully accesses the network 580 (e.g., the Internet), for example, to access multiple independent systems (e.g., multiple applications and/or websites).

A subsequent sign-on session for the user 514, which may be a Single Sign-On (SSO) session in which the user 514 logs in multiple independent systems (e.g., multiple applications and/or websites) using a single set of credentials (e.g., a single ID), takes place from operation 632 to operation 640. At operation 632, a Pre-Shared Key (PSK) is transmitted from the user 514/the network device 504 to the network element 556, which may be, for example, a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3). The PSK may be processed by the network element 556, which can verify the PSK against pre-stored keys in a database and restrict network access of the user 514 if the PSK is incorrect or does not match any pre-stored key. At operation 634, DHCP communications (e.g., DHCP discovery, DHCP offer, DHCP request, and DHCP acknowledgement) between the user 514/the network device 504 and the network element 556 are conducted. At operations 636 and 638, the cloud server 502 authenticates the user 514/the network device 504, for example, using authentication (auth) messages, such as, Media Access Control (MAC) Authentication Bypass (MAB) request and response messages and/or other authentication techniques. After the cloud server 502 successfully authenticates the user 514/the network device 504 (e.g., the credentials (e.g., the ID) provided by or received from the user 514 matches credentials or ID of the user 514 stored in the cloud server 502), the cloud server 502 unblocks or allows the access of the user 514/the network device 504 to the network 580 (e.g., the Internet), for example, to access multiple independent systems (e.g., multiple applications and/or websites). At operation 640, the user 514/the network device 504 successfully accesses the network 580 (e.g., the Internet), for example, to access multiple independent systems (e.g., multiple applications and/or websites).

Figure 7:
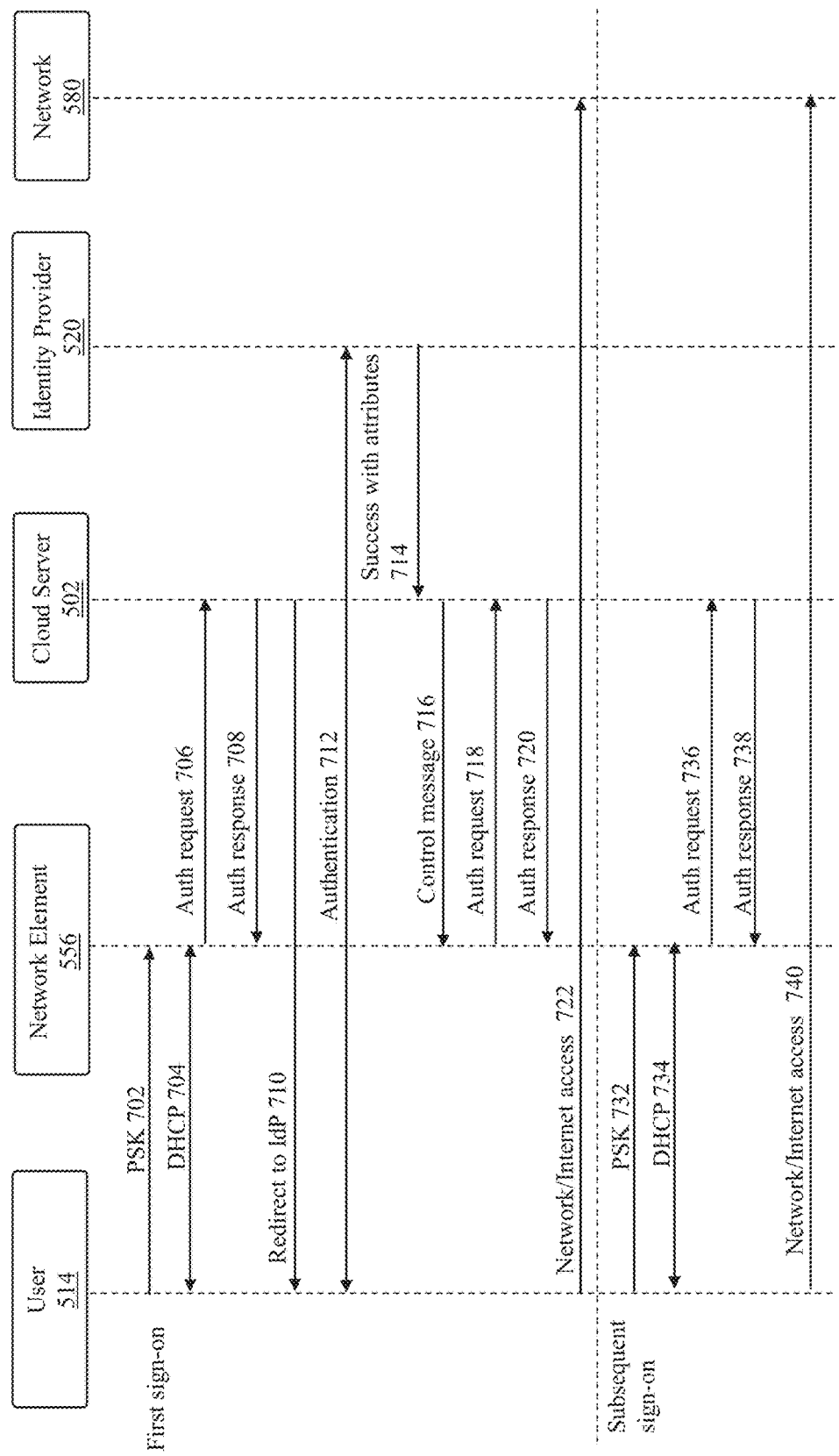
FIG. 7 shows a swim-lane diagram illustrating another example sign-on procedure between the user, the network element, the cloud server, the identity provider, and the network of the network structure depicted in FIG. 5.

FIG. 7 shows a swim-lane diagram illustrating another example sign-on procedure between the user 514, the network element 556, the cloud server 502, the identity provider 520, and the network 580 of the network structure 500 depicted in FIG. 5. Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations.

A first sign-on session for the user 514, which may be a Single Sign-On (SSO) session in which the user 514 logs in multiple independent systems (e.g., multiple applications and/or websites) using a single set of credentials (e.g., a single ID), takes place from operation 702 to operation 722. At operation 702, a Pre-Shared Key (PSK) is transmitted from the user 514/the network device 504 to the network element 556, which may be, for example, a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3). The PSK may be processed by the network element 556, which can verify the PSK against pre-stored keys in a database and restrict network access of the user 514 if the PSK is incorrect or does not match any pre-stored key. At operation 704, DHCP communications (e.g., DHCP discovery, DHCP offer, DHCP request, and DHCP acknowledgement) between the user 514/the network device 504 and the network element 556 are conducted. At operations 706 and 708, authentication (auth) messages, such as, MAC Authentication Bypass (MAB) request and response messages are exchanged between the network element 556 and the cloud server 502. At operation 710, the cloud server 502 blocks or restricts the access of the user 514/the network device 504 to the network 580 (e.g., the Internet) and redirects the sign-on session (e.g., an SSO session) to the identity provider 520. In some embodiments, if the user is not registered, a re-direct Uniform Resource Locator (URL) is sent back to the network element (NE) 556 at operation 708, which triggers a re-direction to the identity provider (IdP) 520, and if the user is not registered, a re-direct URL is not sent back to the network element (NE) 556 at operation 708. At operation 712, the identity provider 520 authenticates the user 514/the network device 504, for example, for Single Sign-On (SSO) to log in multiple independent systems (e.g., multiple applications and/or websites) using a single set of credentials (e.g., a single ID). The operation 712 may involve the network element 556, which can serve as a proxy to forward messages between the user 514/the network device 504 and the identity provider 520. The identity provider 520 may use one or more authentication techniques to authenticate the user 514/the network device 504. In some embodiments, the identity provider 520 performs single-factor/primary authentication, two-factor authentication (2FA), or multi-factor authentication (MFA). The identity provider 520 may perform Security Assertion Markup Language (SAML) based authentication. In some embodiments, the identity provider 520 performs a Security Assertion Markup Language (SAML) based authentication, which allows the identity provider 520 to authenticate a user and then pass an authentication token to the cloud server 502, which is also known as a service provider (SP). At operation 714, the identity provider 520 successfully authenticates the user 514/the network device 504 (e.g., the credentials (e.g., the ID) provided by or received from the user 514 matches credentials or ID of the user 514 stored in the identity provider 520) and sends network attributes associated with the user 514/the network device 504 to the cloud server 502. Examples of network attributes associated with the user 514 may include, without being limited to, first name and last name of the user, email ID of the user, employee ID of the user, employee location of the user, an address of the user, and an organization to which the user belong. Once authenticated, the cloud server 502 may map the network device 504 to the user 514 and keep track of all devices used by the user 514 and thus provide user-based accounting (e.g., billing). By using the identity provider 520 to authenticate the user 514, the need for a centralized Remote Authentication Dial-In User Service (RADIUS) server is reduced or eliminated. Consequently, the network structure 500 can be used in scenarios in which a RADIUS server or service is impracticable or excessively expensive to implement to provide reliable and efficient communications and user-based accounting (e.g., billing) in a network without a dedicated RADIUS server. At operation 716, a control message, such as, a change of authorization (COA) message, is transmitted from the cloud server 502 to the network element 556. At operations 718 and 720, authentication (auth) messages, such as, MAC Authentication Bypass (MAB) request and response messages are exchanged between the network element 556 and the cloud server 502. The cloud server 502 unblocks or allows the access of the user 514/the network device 504 to the network 580 (e.g., the Internet), for example, to access multiple independent systems (e.g., multiple applications and/or websites). At operation 722, the user 514/the network device 504 successfully accesses the network 580 (e.g., the Internet), for example, to access multiple independent systems (e.g., multiple applications and/or websites).

A subsequent sign-on session for the user 514, which may be a Single Sign-On (SSO) session in which the user 514 logs in multiple independent systems (e.g., multiple applications and/or websites) using a single set of credentials (e.g., a single ID), takes place from operation 732 to operation 740. At operation 732, a Pre-Shared Key (PSK) is transmitted from the user 514/the network device 504 to the network element 556, which may be, for example, a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3). The PSK may be processed by the network element 556, which can verify the PSK against pre-stored keys in a database and restrict network access of the user 514 if the PSK is incorrect or does not match any pre-stored key. At operation 734, DHCP communications (e.g., DHCP discovery, DHCP offer, DHCP request, and DHCP acknowledgement) between the user 514/the network device 504 and the network element 556 are conducted. At operations 736 and 738, the cloud server 502 authenticates the user 514/the network device 504, for example, using MAC Authentication Bypass (MAB) request and response messages and/or other authentication techniques. After the cloud server 502 successfully authenticates the user 514/the network device 504 (e.g., the credentials (e.g., the ID) provided by or received from the user 514 matches credentials or ID of the user 514 stored in the cloud server 502), the cloud server 502 unblocks or allows the access of the user 514/the network device 504 to the network 580 (e.g., the Internet), for example, to access multiple independent systems (e.g., multiple applications and/or websites). At operation 740, the user 514/the network device 504 successfully accesses the network 580 (e.g., the Internet), for example, to access multiple independent systems (e.g., multiple applications and/or websites).

Figure 8:
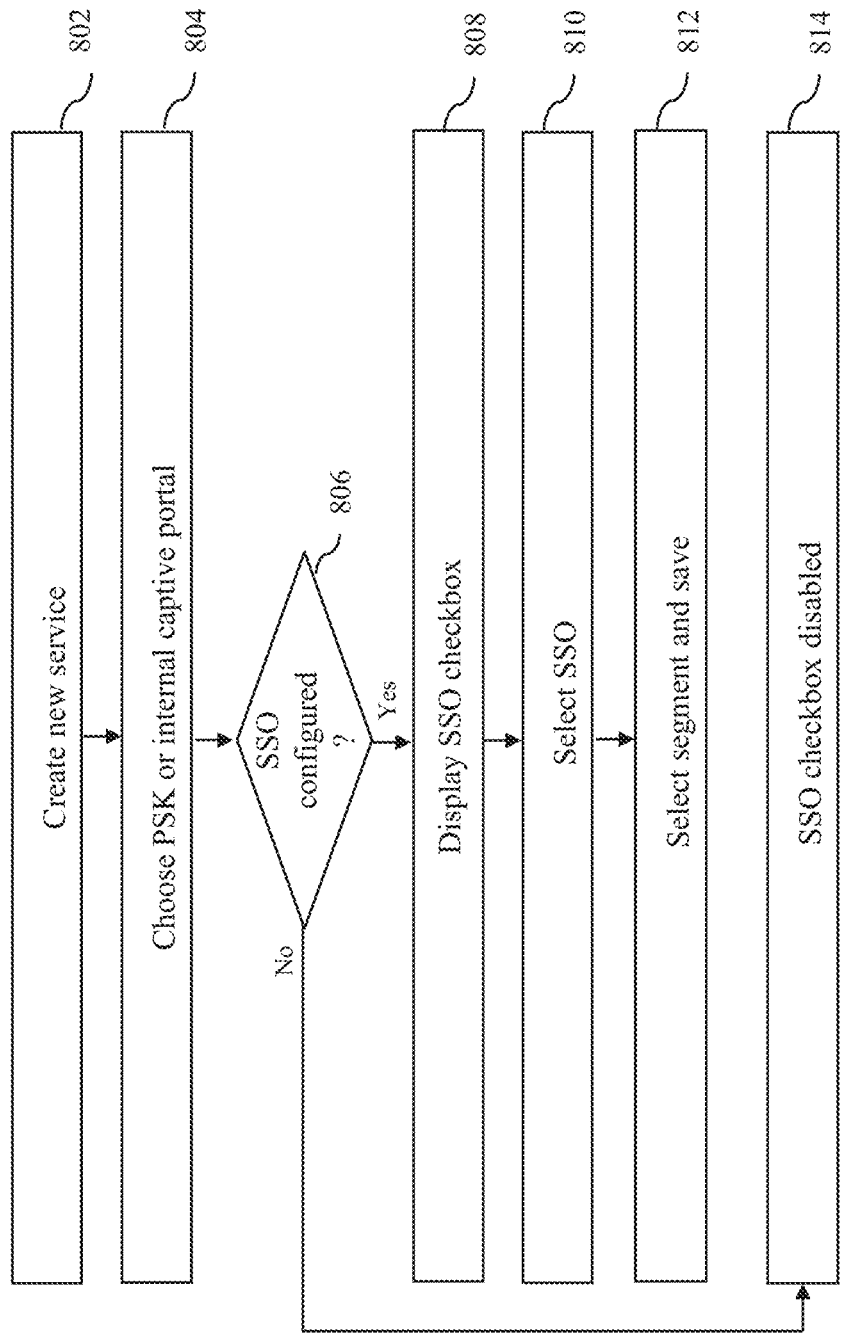
FIG. 8 is a flow diagram of an accounting operation of the cloud server depicted in FIG. 5 in accordance with an embodiment of the invention.

Accounting operations (e.g., billing operations) of the user 514 depicted in FIG. 5 may be implemented by the cloud server 502 and/or the network element 556 using different algorithms. When PSK based SSO is implemented, billings per organization can be generated by mapping multiple segments to a service set identifier (SSID). Each segment represents an organization. When a user (e.g., the user 514) is connected to the network element 556, which may be, for example, a gateway or HE (the HE 354-1 or 354-2 of the network 350 depicted in FIG. 3) or a wireless AP (the wireless AP 360-1, 360-2, 360-3, 360-4, 360-5, or 360-6 of the network 350 depicted in FIG. 3), the user is placed into an onboarding segment and SSO is conducted for the user. From the SSO, the organization name to which the user belong to can be obtained. If the organization name matches a segment name, the user is placed into that segment. FIG. 8 is a flow diagram of an accounting operation of the cloud server 502 depicted in FIG. 5 in accordance with an embodiment of the invention. As illustrated in FIG. 8, the accounting operation of the cloud server 502 depicted in FIG. 5 begins at block 802, where a new service (e.g., a new wireless service) is created, for example, by the cloud server 502. At block 804, a Pre-Shared Key (PSK) or an internal captive portal is chosen or selected for a user (e.g., the user 514 depicted in FIG. 4). At block 806, a determination is made whether Single Sign-On (SSO) is configured for the user. If yes, then the operation proceeds to block 808, where an SSO checkbox is displayed to the user for selection. At block 810, SSO is selected for the user and a segment is selected for the user and saved at block 812. If Single Sign-On (SSO) is not configured for the user, then the operation proceeds to block 814, where an SSO checkbox is grayed out or disabled for the user.

Figure 9:
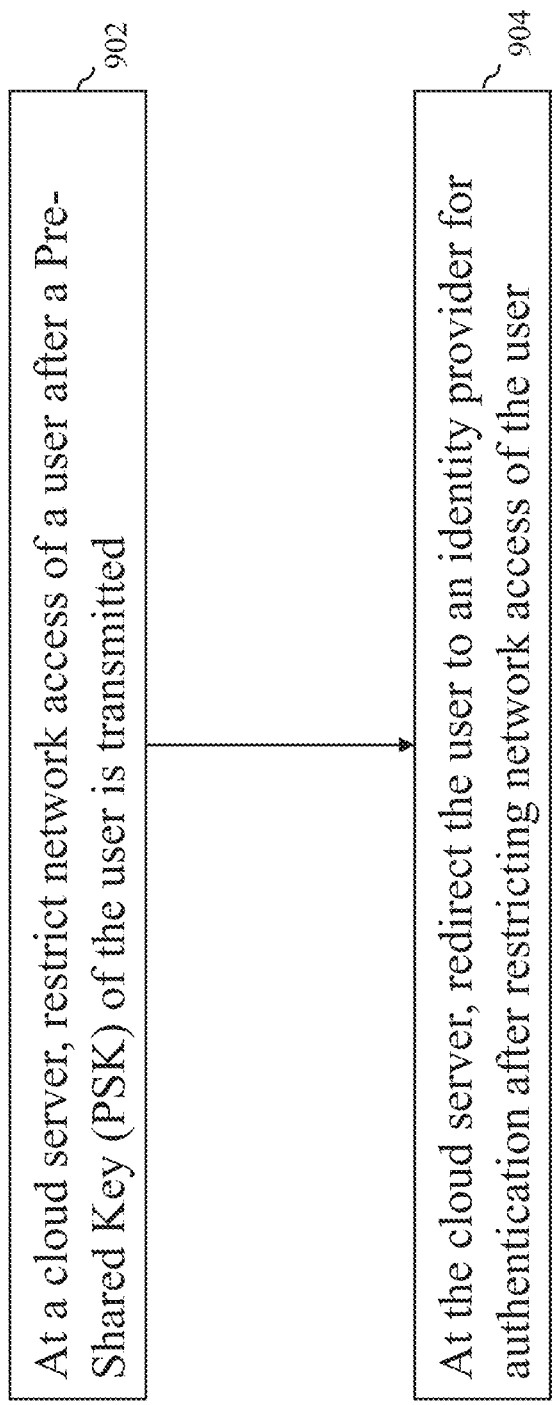
FIG. 9 is a process flow diagram of a method for communications in accordance to an embodiment of the invention.

FIG. 9 is a process flow diagram of a method for communications in accordance to an embodiment of the invention. According to the method, at block 902, at a cloud server, network access of a user is restricted after a Pre-Shared Key (PSK) of the user is transmitted. The user may be restricted to access an identity provider only, if authentication is successful, the user will have full access, otherwise the user is blocked. At block 904, at the cloud server, the user is redirected to an identity provider for authentication after restricting network access of the user. In some embodiments, at the cloud server, the user is redirected to the identity provider for single sign-on (SSO) authentication after restricting network access of the user. In some embodiments, at the cloud server, the user is redirected to the identity provider for Security Assertion Markup Language (SAML) based authentication after restricting network access of the user. In some embodiments, the user operates a network device that is connected to the cloud server through a wireless link. In some embodiments, the network device is wirelessly connected to a wireless access point (AP) that has access to the cloud server. In some embodiments, at the cloud server, network access of a second user is allowed after a second PSK of the second user is transmitted when a Media Access Control (MAC) address of a network device at which the second user operates matches an entry in a predetermined list of allowed MAC addresses. In some embodiments, it is determined that a MAC address of a network device at which the user operates does not match an entry in a predetermined list of allowed MAC addresses. In some embodiments, at the cloud server, attributes of the user are received from the identity provider after the user is successfully authenticated. In some embodiments, at the cloud server, network access of the user is allowed after the attributes of the user are received from the identity provider. In some embodiments, at the cloud server, an accounting operation of the user is performed based on the attributes of the user are received from the identity provider. In some embodiments, at the cloud server, the accounting operation of the user is performed to generate billing information for the user based on the attributes of the user are received from the identity provider. In some embodiments, at the cloud server, network access of the user is allowed after the Pre-Shared Key (PSK) of the user is retransmitted in a subsequent sign-on session. In some embodiments, at the cloud server, MAC Authentication Bypass (MAB) request and response messages are exchanged in the subsequent sign-on session. In some embodiments, Dynamic Host Configuration Protocol (DHCP) information is exchanged between a network device at which the user operates and a network element that has access to the cloud server. In some embodiments, the network element includes a wireless access point (AP) or a gateway. The cloud server may be similar to, the same as, or a component of the cloud server 102 depicted in FIG. 2, and/or the cloud server 502 depicted in FIGS. 5-7. The identity provider may be similar to, the same as, or a component of the identity provider 120 depicted in FIG. 2, and/or the identity provider 520 depicted in FIGS. 5-7. The user may be similar to, the same as, or a component of the user 514 depicted in FIGS. 5-7. The network device may be similar to, the same as, or a component of the network devices 104-1, . . . , 104-N depicted in FIG. 1, the network device 204 depicted in FIG. 2, and/or the network device 504 depicted in FIG. 5. The network element may be similar to, the same as, or a component of the HE 354-1, 354-2 depicted in FIG. 3, the wireless APs 360-1, 360-2, 360-3, 360-4, 360-5, 360-6 depicted in FIG. 3, and the network element 556 depicted in FIGS. 5-7.

Figure 10:
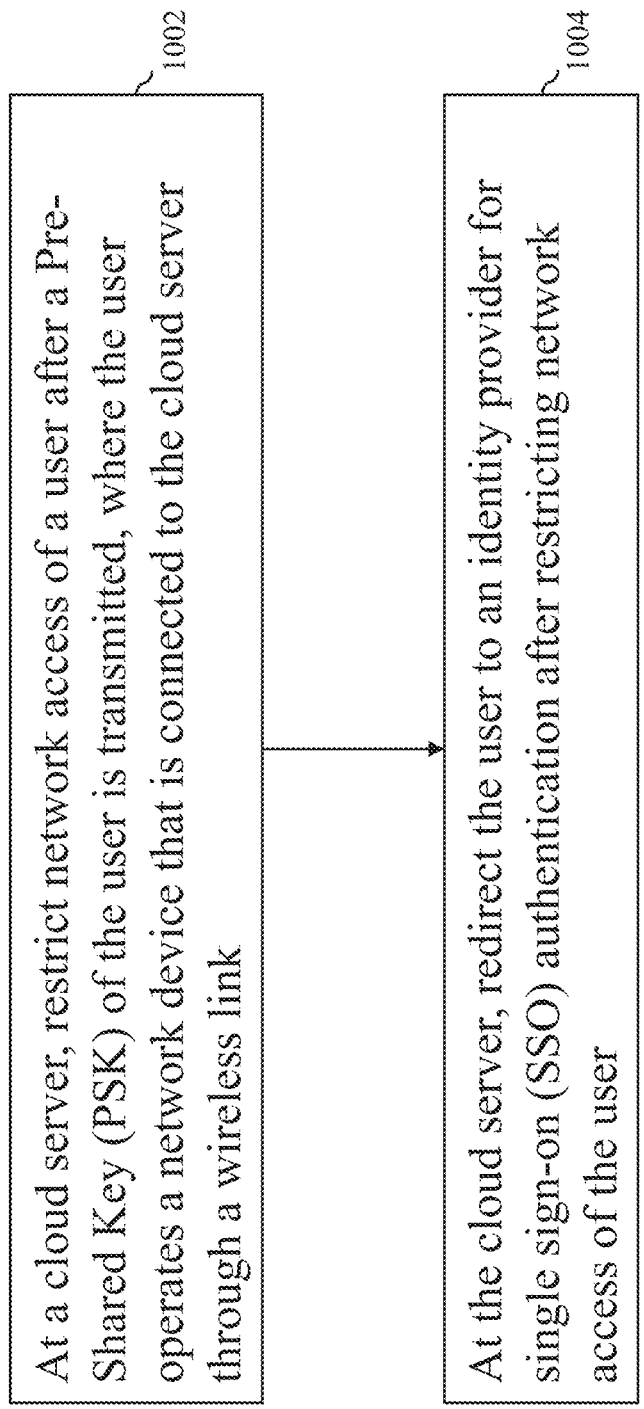
FIG. 10 is a process flow diagram of a method for communications in accordance to an embodiment of the invention.

FIG. 10 is a process flow diagram of a method for communications in accordance to an embodiment of the invention. According to the method, at block 1002, at a cloud server, network access of a user is restricted after a Pre-Shared Key (PSK) of the user is transmitted, where the user operates a network device that is connected to the cloud server through a wireless link. At block 1004, at the cloud server, the user is redirected to an identity provider for single sign-on (SSO) authentication after restricting network access of the user. In some embodiments, it is determined that a Media Access Control (MAC) address of a network device at which the user operates does not match an entry in a predetermined list of allowed MAC addresses. In some embodiments, at the cloud server, network access of a second user is allowed after a second PSK of the second user is transmitted when a MAC address of a network device at which the second user operates matches an entry in a predetermined list of allowed MAC addresses. In some embodiments, at the cloud server, attributes of the user are received from the identity provider after the user is successfully authenticated, and at the cloud server, network access of the user is allowed after the attributes of the user are received from the identity provider. The cloud server may be similar to, the same as, or a component of the cloud server 102 depicted in FIG. 2, and/or the cloud server 502 depicted in FIGS. 5-7. The identity provider may be similar to, the same as, or a component of the identity provider 120 depicted in FIG. 2, and/or the identity provider 520 depicted in FIGS. 5-7. The user may be similar to, the same as, or a component of the user 514 depicted in FIGS. 5-7. The network device may be similar to, the same as, or a component of the network devices 104-1, . . . , 104-N depicted in FIG. 1, the network device 204 depicted in FIG. 2, and/or the network device 504 depicted in FIG. 5.

Figure 11:
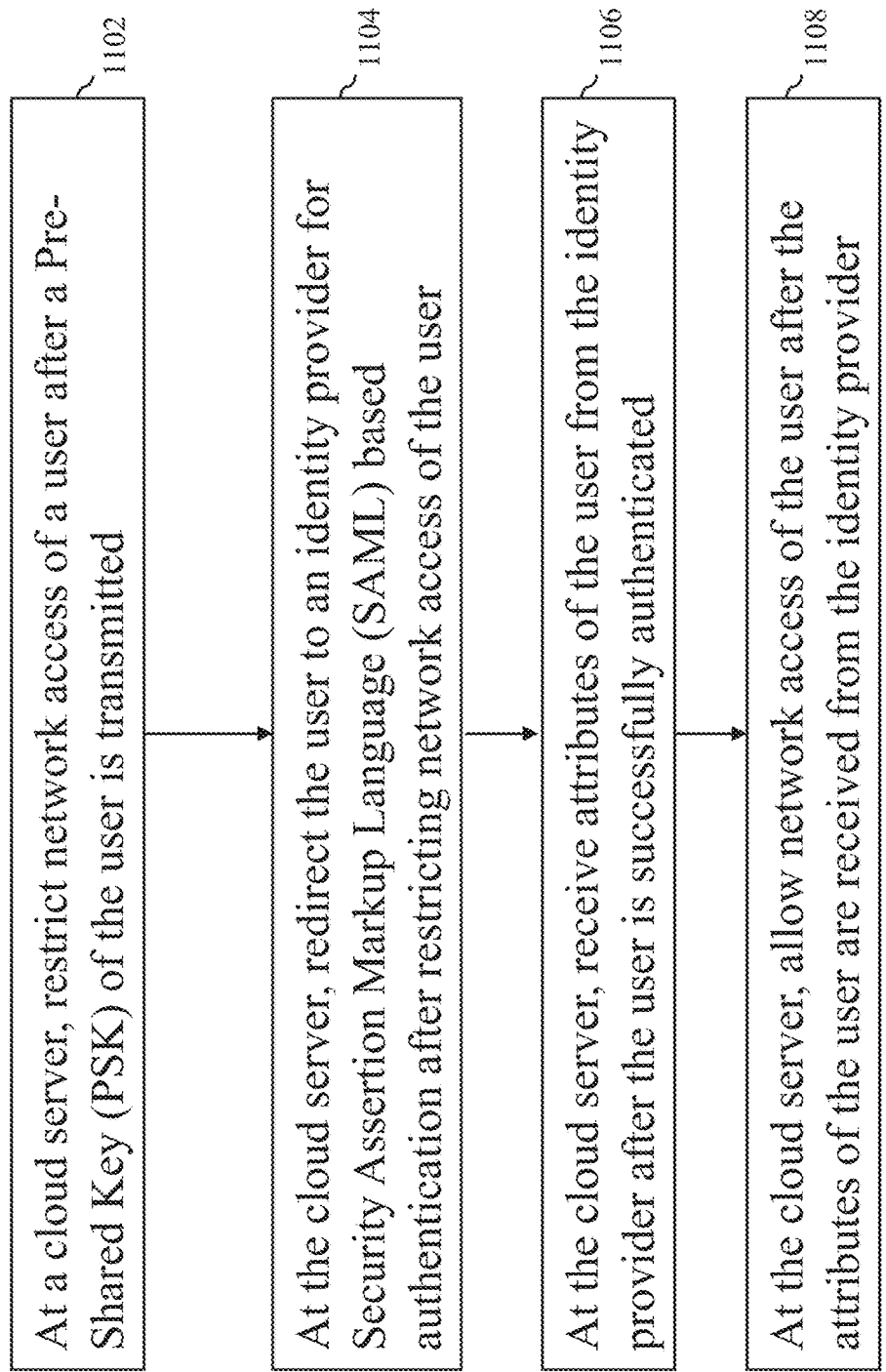
FIG. 11 is a process flow diagram of a method for communications in accordance to an embodiment of the invention.

FIG. 11 is a process flow diagram of a method for communications in accordance to an embodiment of the invention. According to the method, at block 1102, at a cloud server, network access of a user is restricted after a Pre-Shared Key (PSK) of the user is transmitted. At block 1104, at the cloud server, the user is redirected to an identity provider for Security Assertion Markup Language (SAML) based authentication after restricting network access of the user. At block 1106, at the cloud server, attributes of the user are received from the identity provider after the user is successfully authenticated. At block 1108, at the cloud server, network access of the user is allowed after the attributes of the user are received from the identity provider. The cloud server may be similar to, the same as, or a component of the cloud server 102 depicted in FIG. 2, and/or the cloud server 502 depicted in FIGS. 5-7. The identity provider may be similar to, the same as, or a component of the identity provider 120 depicted in FIG. 2, and/or the identity provider 520 depicted in FIGS. 5-7. The user may be similar to, the same as, or a component of the user 514 depicted in FIGS. 5-7.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for communications, the method comprising:
at a cloud server that comprises a network management module, a customer information portal connected to the network management module, and a network management database configured to store network management data, restricting network access of a user after a Pre-Shared Key (PSK) of the user is transmitted from the user to a network element that is located between the user and the cloud server in a first sign-on session for the user to verify against a plurality of pre-stored keys in a database, wherein at the cloud server, restricting network access of the user after the PSK of the user is transmitted comprises determining that a Media Access Control (MAC) address of a network device at which the user operates does not match an entry in a predetermined list of allowed MAC addresses; and
at the cloud server, redirecting the user to an identity provider for authentication after restricting network access of the user, wherein at the cloud server, redirecting the user to the identity provider for authentication after restricting network access of the user comprises at the cloud server, redirecting the user to the identity provider for Security Assertion Markup Language (SAML) based authentication after restricting network access of the user.

2. The method of claim 1, wherein at the cloud server, redirecting the user to the identity provider for authentication after restricting network access of the user comprises at the cloud server, redirecting the user to the identity provider for single sign-on (SSO) authentication after restricting network access of the user.

3. The method of claim 1, further comprising at the cloud server, allowing network access of a second user after a second PSK of the second user is transmitted when a MAC address of a second network device at which the second user operates matches an entry in the predetermined list of allowed MAC addresses.

4. The method of claim 1, further comprising exchanging Dynamic Host Configuration Protocol (DHCP) information between a network device at which the user operates and a network element that has access to the cloud server.

5. The method of claim 1, wherein the identity provider is not a Remote Authentication Dial-In User Service (RADIUS) server.

6. The method of claim 1, wherein the user operates a network device that is connected to the cloud server through a wireless link.

7. The method of claim 6, wherein the network device is wirelessly connected to a wireless access point (AP) that has access to the cloud server.

8. The method of claim 1, further comprising at the cloud server, receiving a plurality of attributes of the user from the identity provider after the user is successfully authenticated.

9. The method of claim 8, further comprising at the cloud server, allowing network access of the user after the attributes of the user are received from the identity provider.

10. The method of claim 8, further comprising at the cloud server, performing an accounting operation of the user based on the attributes of the user are received from the identity provider.

11. The method of claim 10, wherein at the cloud server, performing the accounting operation of the user comprises at the cloud server, performing the accounting operation of the user to generate billing information for the user based on the attributes of the user are received from the identity provider.

12. The method of claim 1, further comprising at the cloud server, allowing network access of the user after the Pre-Shared Key (PSK) of the user is retransmitted in a subsequent sign-on session.

13. The method of claim 12, further comprising at the cloud server, exchanging Media Access Control (MAC) Authentication Bypass (MAB) request and response messages in the subsequent sign-on session.

14. A method for communications, the method comprising:
at a cloud server that comprises a network management module, a customer information portal connected to the network management module, and a network management database configured to store network management data, restricting network access of a user after a Pre-Shared Key (PSK) of the user is transmitted from the user to a network element that is located between the user and the cloud server in a first sign-on session for the user to verify against a plurality of pre-stored keys in a database, wherein the user operates a network device that is connected to the cloud server through a wireless link, and wherein at the cloud server, restricting network access of the user after the PSK of the user is transmitted comprises determining that a Media Access Control (MAC) address of a network device at which the user operates does not match an entry in a predetermined list of allowed MAC addresses; and
redirecting the user to an identity provider for single sign-on (SSO) authentication after restricting network access of the user, wherein at the cloud server, redirecting the user to the identity provider for authentication after restricting network access of the user comprises at the cloud server, redirecting the user to the identity provider for Security Assertion Markup Language (SAML) based authentication after restricting network access of the user.

15. The method of claim 14, further comprising at the cloud server, allowing network access of a second user after a second PSK of the second user is transmitted when a MAC address of a second network device at which the second user operates matches an entry in the predetermined list of allowed MAC addresses.

16. The method of claim 14, further comprising:
at the cloud server, receiving a plurality of attributes of the user from the identity provider after the user is successfully authenticated; and
at the cloud server, allowing network access of the user after the attributes of the user are received from the identity provider.

17. A method for communications, the method comprising:
at a cloud server that comprises a network management module, a customer information portal connected to the network management module, and a network management database configured to store network management data, restricting network access of a user after a Pre-Shared Key (PSK) of the user is transmitted from the user to a network element that is located between the user and the cloud server in a first sign-on session for the user to verify against a plurality of pre-stored keys in a database, wherein at the cloud server, restricting network access of the user after the PSK of the user is transmitted comprises determining that a Media Access Control (MAC) address of a network device at which the user operates does not match an entry in a predetermined list of allowed MAC addresses;
at the cloud server, redirecting the user to an identity provider for Security Assertion Markup Language (SAML) based authentication after restricting network access of the user;
receiving a plurality of attributes of the user from the identity provider after the user is successfully authenticated; and
at the cloud server, allowing network access of the user after the attributes of the user are received from the identity provider.

\* \* \* \* \*